(12) United States Patent
Dingman et al.

(10) Patent No.: US 10,259,357 B2
(45) Date of Patent: Apr. 16, 2019

(54) CENTRAL-ADJUST SOFT-BACK VEHICLE SEAT

(71) Applicant: Indiana Mills & Manufacturing Inc, Westfield, IN (US)

(72) Inventors: Guy R. Dingman, Westfield, IN (US); Jason Boyer, Columbus, IN (US); Rachael Blake, Cicero, IN (US)

(73) Assignee: Indiana Mills & Manufacturing Inc, Westfield, MA (US)

(*) Notice: Subject to any disclaimer, the term of this patent is extended or adjusted under 35 U.S.C. 154(b) by 248 days.

(21) Appl. No.: 15/071,697

(22) Filed: Mar. 16, 2016

(65) Prior Publication Data
US 2017/0267130 A1 Sep. 21, 2017

(51) Int. Cl.
*B60N 2/28* (2006.01)
*B60N 2/42* (2006.01)
*B60R 21/02* (2006.01)
*A47D 15/00* (2006.01)

(52) U.S. Cl.
CPC .......... *B60N 2/2812* (2013.01); *B60N 2/286* (2013.01); *B60N 2/2809* (2013.01); *B60N 2/2866* (2013.01); *A47D 15/006* (2013.01); *B60N 2/2881* (2013.01); *B60N 2/4235* (2013.01); *B60N 2002/2896* (2013.01); *B60R 21/02* (2013.01)

(58) Field of Classification Search
CPC .. B60N 2/2812; B60N 2/2809; B60N 2/2866; B60N 2/2881; B60N 2/286; B60N 2/4235; A47D 15/006; A61G 2005/1091; B60R 21/02

USPC .... 297/252, 464, 253, 250.1, 465–468, 486, 297/216.11
See application file for complete search history.

(56) References Cited

U.S. PATENT DOCUMENTS

| 4,660,889 A * | 4/1987 | Anthony ................ A44B 11/14 24/68 CD |
| 5,366,271 A * | 11/1994 | Johnston ................ B60N 2/286 297/250.1 |
| 5,496,092 A * | 3/1996 | Williams ............... A61F 5/3792 297/250.1 |
| 2006/0076812 A1* | 4/2006 | Ward .................... B60N 2/2881 297/250.1 |
| 2007/0001495 A1* | 1/2007 | Boyle .................. B60N 2/2806 297/253 |

(Continued)

*Primary Examiner* — Syed A Islam
(74) *Attorney, Agent, or Firm* — Woodard, Emhardt, Henry, Reeves & Wagner, LLP

(57) ABSTRACT

A passenger seat is described for use with a vehicle seat and includes, a base, an attachment assembly, a restraint assembly, and a non-rigid back. The base includes a central front opening. The attachment assembly includes a plurality of straps, which are configured to adjustably secure the base to the vehicle seat. The restraint assembly includes a shoulder strap assembly, a crotch strap assembly, and an adjustment strap. The adjustment strap is in communication with the shoulder strap assembly, extending from the shoulder strap assembly through the base and out of the central front opening of the base. The adjustment strap assembly is configured to adjust the shoulder strap assembly in response to translation of the adjustment strap through the central front opening of the base. The back encompasses at least a portion of the restraint assembly and the attachment assembly.

14 Claims, 12 Drawing Sheets

(56) References Cited

U.S. PATENT DOCUMENTS

2010/0264706 A1\* 10/2010 Vogt ..................... B60N 2/2812
297/250.1

\* cited by examiner

CENTRAL-ADJUST SOFT-BACK VEHICLE SEAT

BACKGROUND

Vehicle seats may be used to secure a passenger in a vehicle. Some such seats may be configured for use with a small or adolescent passenger and may incorporate webs or straps to secure the seat to the vehicle, and likewise the passenger to the seat. To accommodate different vehicle configurations and/or passengers of variable sizes, straps may be designed with excess length to provide adjustability. When the seat is then secured to the vehicle, and the passenger is secured to the seat, the straps may be adjusted to a shorter effective length for a relatively snug fit. Such adjustability may be desirable in some instances to permit compatible use of the same seat with various fixed vehicle seats and/or variously sized passengers. Additionally, some such passenger seats may include various backing apparatuses or members. In some instances it may be desirable to minimize the side profile of such backing members. For instance, such a minimization of side profile may be desirable because less thickness may result in greater seating space and/or enhanced stowability when the seat is not in use. Thus, there is a need to provide a means for increasing usability of a passenger seat with passengers of variable sizes, as well as provide such a passenger seat that is readily stowable when not in use.

While a variety of stowable car seats have been made and used, it is believed that no one prior to the inventor(s) has made or used an invention as described herein.

BRIEF DESCRIPTION OF THE DRAWINGS

While the specification may conclude with one or more claims that particularly point out and distinctly claim the invention, it is believed the present invention will be better understood from the following description of certain examples taken in conjunction with the accompanying drawings, in which like reference numerals identify the same elements.

Figure 1:
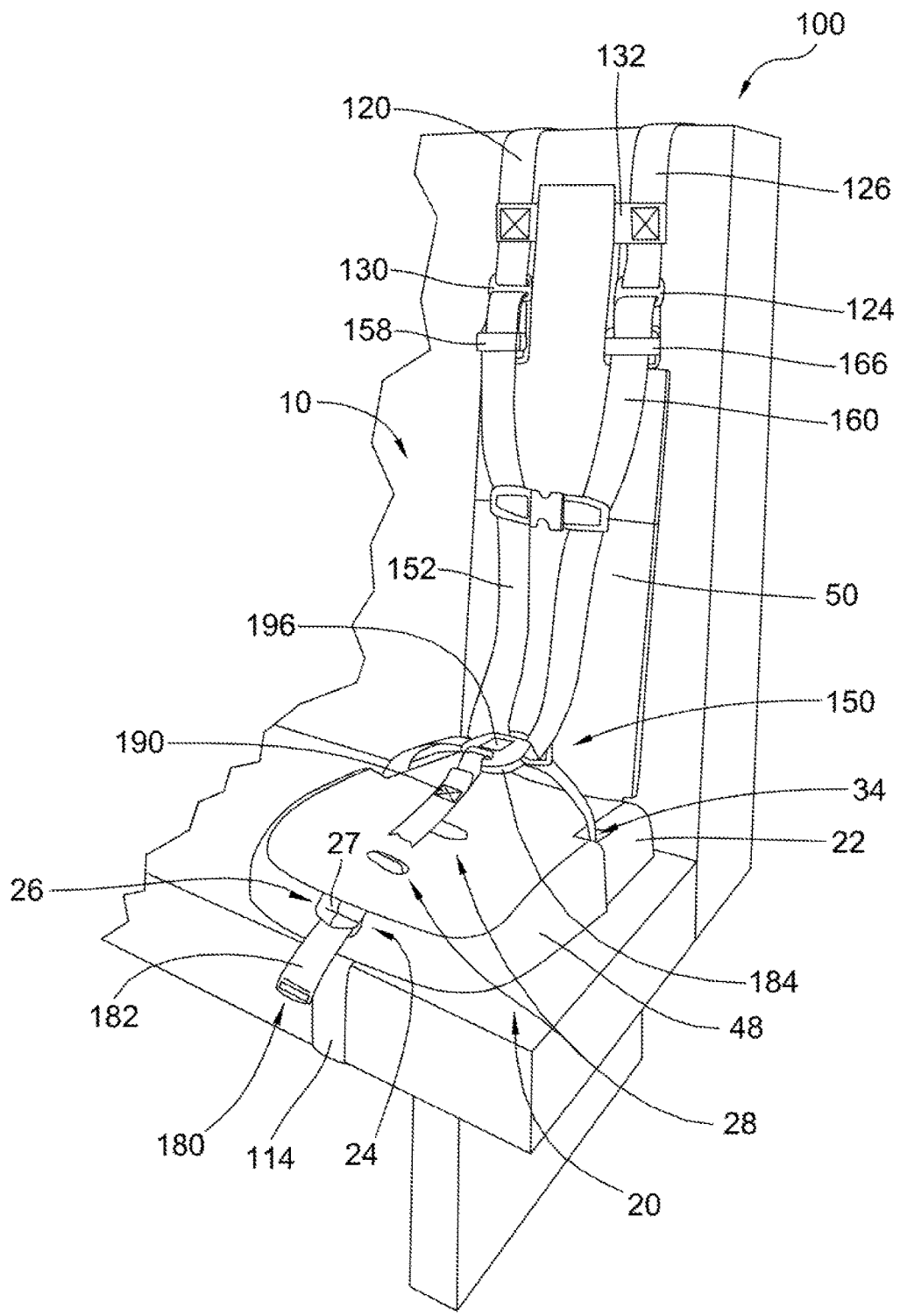
FIG. 1 depicts a perspective view of an exemplary passenger seat for use with an existing vehicle seat.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description. As will be realized, the invention is capable of other different and obvious aspects, all without departing from the invention. Accordingly, the drawings and descriptions should be regarded as illustrative in nature and not restrictive.

FIG. 1 illustrates an exemplary passenger seat (10). Passenger seat (10) of the present example is generally configured for use with a child or small adult to reconfigure an existing vehicle passenger seat to accommodate such a passenger. Although passenger seat (10) of the present example is depicted as being used in conjunction with a conventional bench-style bus seat (e.g., seats typically installed on school busses), it should be understood that in other examples passenger seat (10) is readily usable with any other suitable permanent vehicle seat. Passenger seat (10) comprises a base (20), a seat back (50), an attachment webbing assembly (100), and a restraint webbing assembly (150).

Figure 2:
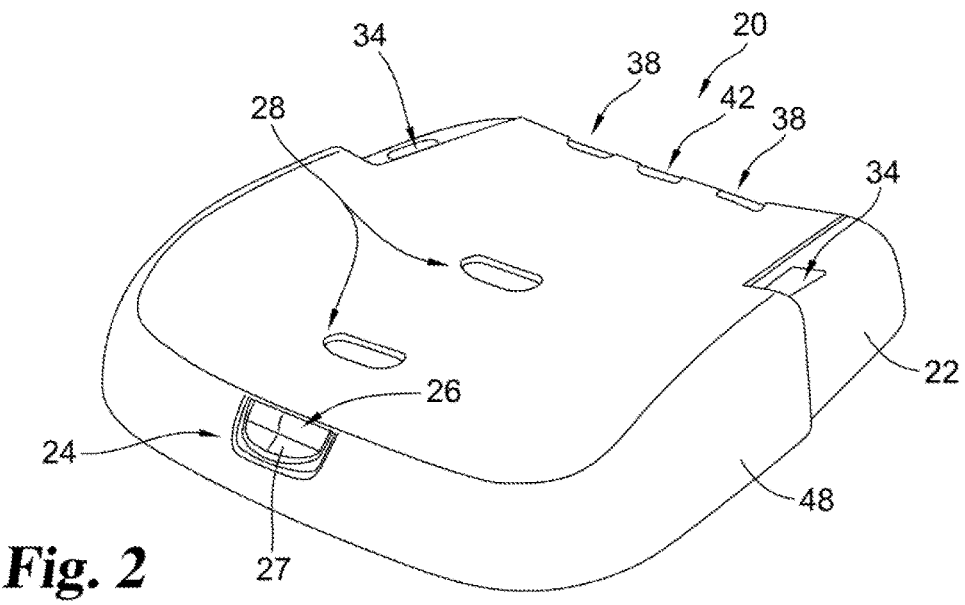
FIG. 2 depicts a perspective view of a base of the passenger seat of FIG. 1.
Figure 3:
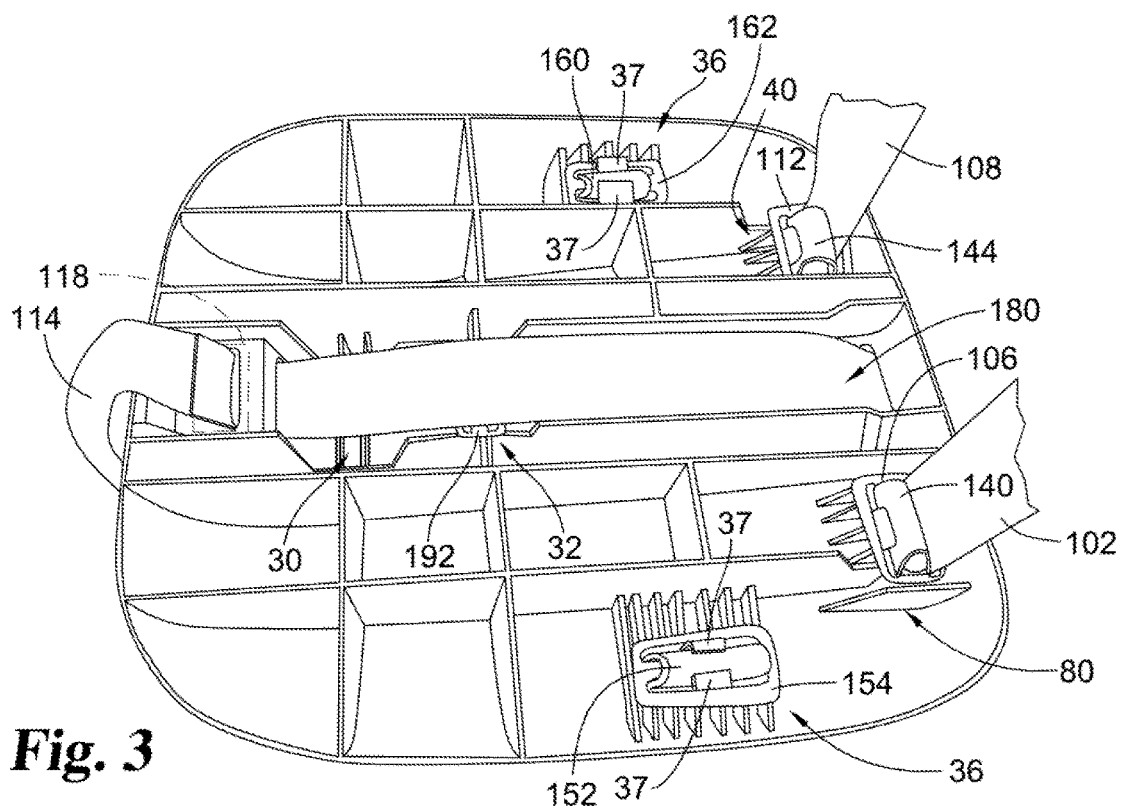
FIG. 3 depicts another perspective view of the base of FIG. 2, with the underside of the base visible and an external pad removed.
Figure 4:
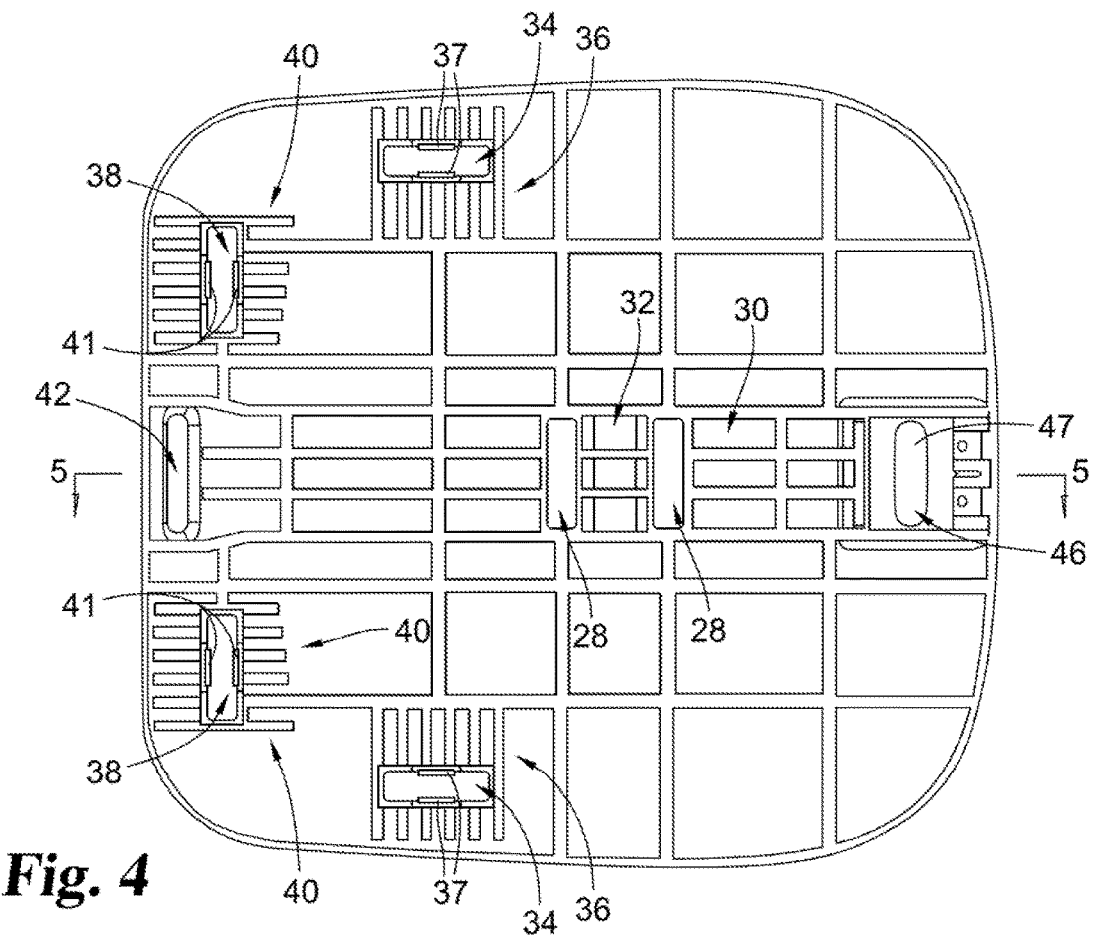
FIG. 4 depicts a bottom plan view of the base of FIG. 2.

FIGS. 2-4 illustrate base (20) in greater detail. In particular, as can best be seen in FIG. 2, the shape of base (20) is generally defined by a hard plastic or composite inner core (22) and a relatively soft pad (48). Core (22) provides a base with a rigid structure and shape, while pad (48) enhances passenger comfort. Together, core (22) and pad (48) are configured to act as a seat for a passenger—lifting the passenger upwardly to account for a relatively small torso length and providing a soft seating surface for passenger comfort. It should be understood that pad (48) of the present example is merely optional and is omitted in some examples. Indeed, pad (48) of the present example simply slides into position over the outer surface of core (22). Accordingly, pad (48) of the present example may be omitted or removed at the option of an operator.

In addition to adding structural support, base (20) provides a rigid ground for attachment of attachment webbing assembly (100) and restraint webbing assembly (150). In particular, the upper portion of base (20) comprises a front adjustment opening (24), a pair of crotch openings (28), a pair of shoulder openings (34), a pair of attachment openings (38), and a rear adjustment opening (42). Front adjustment opening (24) is configured to receive an adjustment strap (180) of restraint webbing assembly (150). Front adjustment opening (24) further includes an adjustment lock (26) disposed within front adjustment opening (24). As is described in greater detail below, adjustment lock (26) includes a lock actuator (27) that permits an operator to selectively adjust the amount of slack in restraint webbing assembly (150).

Crotch openings (28) are configured to receive a single crotch strap (190) of restraint webbing assembly (150). In other words, each crotch opening (28) is configured to be used discretely such that crotch strap (190) is disposed in one crotch opening (28) or another, but not both. As is described in greater detail below, this configuration of crotch openings (28) permits an operator to selectively switch crotch strap (190) between the two different positions to accommodate passengers of different sizes.

Each shoulder opening (34) is configured to receive a respective shoulder strap (152, 160) of restraint webbing assembly (150). As is described in greater detail below, each shoulder strap (152, 160) is anchored inside core (22) of base (20). Similarly, each attachment opening (38) is configured to receive a respective lower attachment strap (140, 144) of attachment webbing assembly (100) such that each attachment strap is anchored inside core (22) of base (20).

Rear adjustment opening (42) is configured to slidably receive adjustment strap (180) of restraint webbing assembly (150). As is described in greater detail below, adjustment strap (180) generally extends through rear adjustment opening (42), through core (22), to adjustment lock (26) before protruding outwardly through front adjustment opening (24). As is also described in greater detail below, this configuration generally permits an operator to pull an actuation portion (182) of adjustment strap (180) to selectively remove slack from shoulder straps (152, 160).

FIGS. 3 and 4 illustrate an underside view of core (22). It should be understood that in the views shown, pad (48) is removed such that the interior of core (22) is visible. However, it should be understood that when pad (48) is installed over core (22), the underside of core (22) is effectively covered. As can be seen, core (22) comprises a plurality of support portions (30, 32, 36, 40) adjacent to each of crotch openings (28), shoulder openings (34), and attachment openings (38). Although each support portion (30, 32, 36, 40) of the present example is comprised of a plurality of closely arranged structural members, it should be understood that in other examples each support portion (30, 32, 36, 40) comprises a discrete platform. As is described in greater detail below, each support portion (30, 32, 36, 40) is configured to support a triglide buckle to fixedly secure a particular strap (102, 108, 114, 140, 144, 152, 160) or attachment webbing assembly (100) or shoulder webbing assembly (150) to base (20).

Figure 5:
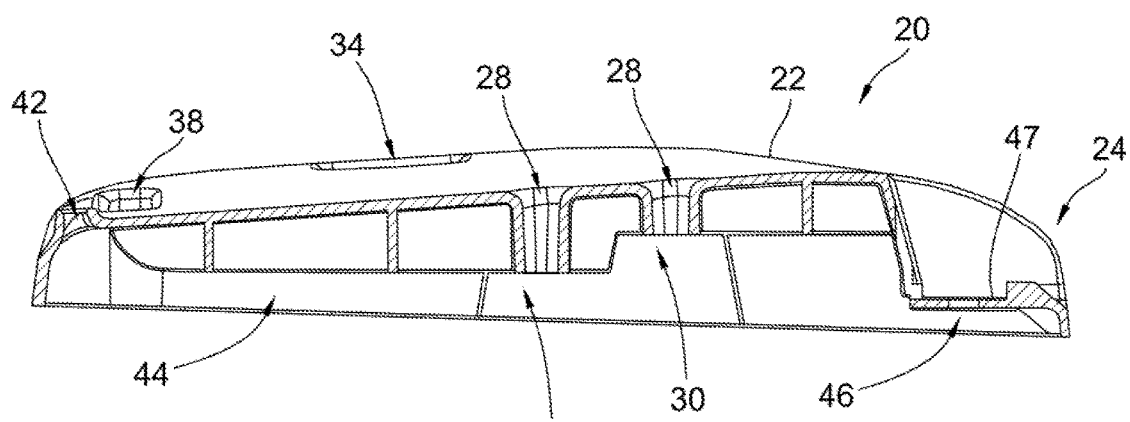
FIG. 5 depicts a side cross-sectional view of the base of FIG. 2, with the cross-section taken along line 5-5 in FIG. 4.

Each crotch opening (28) is associated with a corresponding first support portion (30) and second support portion (32). As is best seen in FIG. 5, first support portion (30) is oriented closer to crotch opening (28) relative to second support portion (32). In other words, a smaller distance separates the surface defined by first support portion (30) and the corresponding crotch opening (28), while a greater distance separates the surface defined by second support portion (32) and the corresponding crotch opening (28). As will be understood, such an arrangement is configured to vary the length of crotch strap (190) depending on which crotch opening (28) crotch strap (190) passes through. For instance, if crotch strap (190) is inserted into the crotch opening (28) associated with first support portion (30), a base buckle (192) of crotch strap (190) will be closer to crotch opening (28), thereby providing a greater effective crotch strap (190) length. Similarly, if crotch strap (190) is inserted into the crotch opening (28) associated with second support portion (32), base buckle (192) will be farther away from crotch opening (28), thereby providing a smaller effective crotch strap (190) length.

Each shoulder opening (34) is associated with a particular support portion (36). Unlike support portions (30, 32) described above, the respective support portions (36) associated with each shoulder opening (34) are substantially similar. Each support portion (36) is generally configured to support a respective buckle (154, 162) of a given shoulder strap (152, 160). Accordingly, each support portion (36) is configured to provide a mechanical ground for each shoulder strap (152, 160) to prevent each shoulder strap (152, 160) from being pulled vertically from base (20). Each support portion (36) includes a pair of resilient tabs (37). Resilient tabs (37) are configured to engage each buckle (154, 162) to selectively secure each buckle (154, 162) to base (20). This selective engagement maintains each buckle (154, 162) in position on each respective support portion (36) during ordinary use. However, should an operator desire to remove support straps (152, 160) (for example, for cleaning), an operator may do so by decoupling each buckle (154, 162) from resilient tabs (37) and reorienting each buckle (154, 162) to translate longitudinally through each respective shoulder opening (34).

Each attachment opening (38) is associated with a particular support portion (40). Unlike support portions (30, 32) described above, the respective support portions (40) associated with each attachment opening (38) are substantially similar. Each support portion (40) is generally configured to support a respective buckle (106, 112) of a given lower attachment strap (140, 144). Accordingly, each support portion (40) is configured to provide a mechanical ground for each lower attachment strap (140, 144) to prevent each lower attachment strap (140, 144) from being pulled vertically from base (20). Each support portion (40) includes a pair of resilient tabs (41). Resilient tabs (41) are configured to engage each buckle (106, 112) to selectively secure each buckle (106, 112) to base (20). This selective engagement maintains each buckle (106, 112) in position on each respective support portion (40) during ordinary use. However, should an operator desire to remove lower attachment straps (140, 144) (for example, for cleaning), an operator may do so by decoupling each buckle (106, 112) from resilient tabs (41) and reorienting each buckle (106, 112) to translate longitudinally through each respective attachment opening (38).

Unlike crotch openings (28), shoulder openings (34), and attachment openings (38) described above, front and rear adjustment openings (24, 42) are not associated with a support portion. Instead, front and rear adjustment openings (24, 42) are configured to slidably receive adjustment strap (180). In particular, rear adjustment opening (42) slidably receives adjustment strap (180). Adjustment strap (180) then extends longitudinally through a channel (44) of core (22) over crotch openings (28) to front adjustment opening (24). Attachment strap (180) is then threaded through adjustment lock (26) and out of front adjustment opening (24). As is described in greater detail below, this configuration permits an operator to pull an adjustment portion (182) of adjustment strap (180) away from front adjustment opening (24) to selectively adjust shoulder webbing assembly (150).

Core (22) of base (20) further comprises a central attachment opening (46). Central attachment opening (46) is adjacent to front adjustment opening (24). However, unlike other openings (24, 28, 34, 38, 42) described herein that open toward the upper exterior of core (22), central attachment opening (46) is oriented to open downwardly. As is described in greater detail below, this configuration permits a bottom central attachment strap (114) to extend downwardly from central attachment opening (46). To facilitate such functionally, central attachment opening (46) is associated with a corresponding support portion (47). Unlike other support portions (30, 32, 36, 40) described herein, support portion (47) is defined by the lower interior wall of front adjustment opening (24). Thus, instead of being defined by a plurality of closely arranged structural members, support portion (47) is defined by a discrete surface. Of course, in other examples support portion (47) comprises a similar construction to support portions (30, 32, 36, 40) described above.

Figure 6:
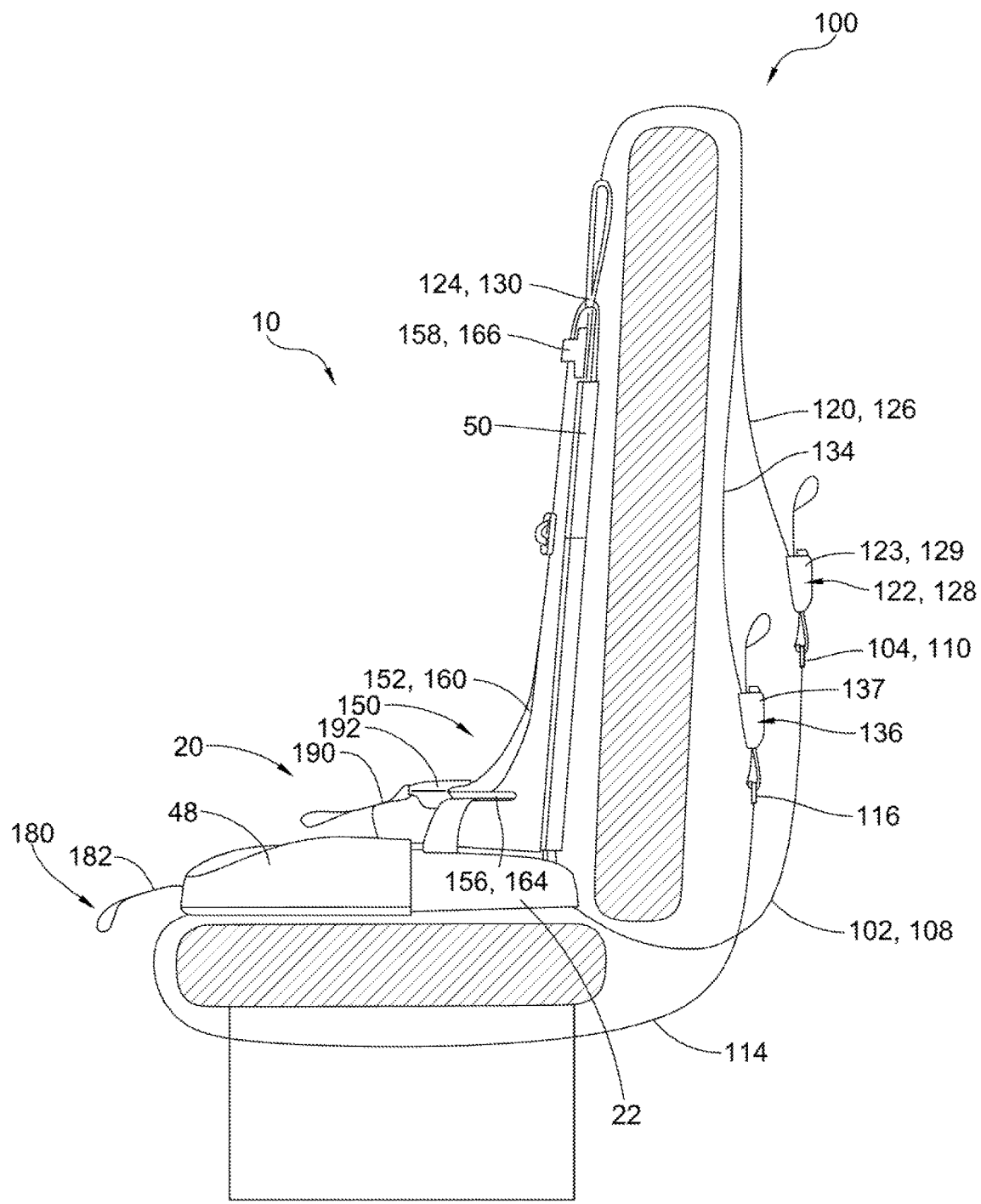
FIG. 6 depicts a side elevational view of the passenger seat of FIG. 1.

Returning to FIG. 1, seat back (50) comprises a relatively soft, thin, and flexible material such as a vinyl sheet, woven fabric, or other material as will occur to those skilled in the art. Seat back (50) of the present example wraps around at least a portion of attachment webbing assembly (100) and shoulder webbing assembly (150), thereby providing a buffer between each webbing assembly (100, 150) and a passenger. However, seat back (50) still permits translation of each webbing assembly (100, 150) within seat back (50). As can be seen in FIG. 6, seat back (50) is relatively thin-just slightly thicker than the combination of attachment webbing assembly (100) and shoulder webbing assembly (150). In some examples, seat back (50) of such a thickness may be desirable because a relatively thin seat back (50) may generally increase the stowability of passenger seat (10) when passenger seat (10) is not in use.

Figure 7:
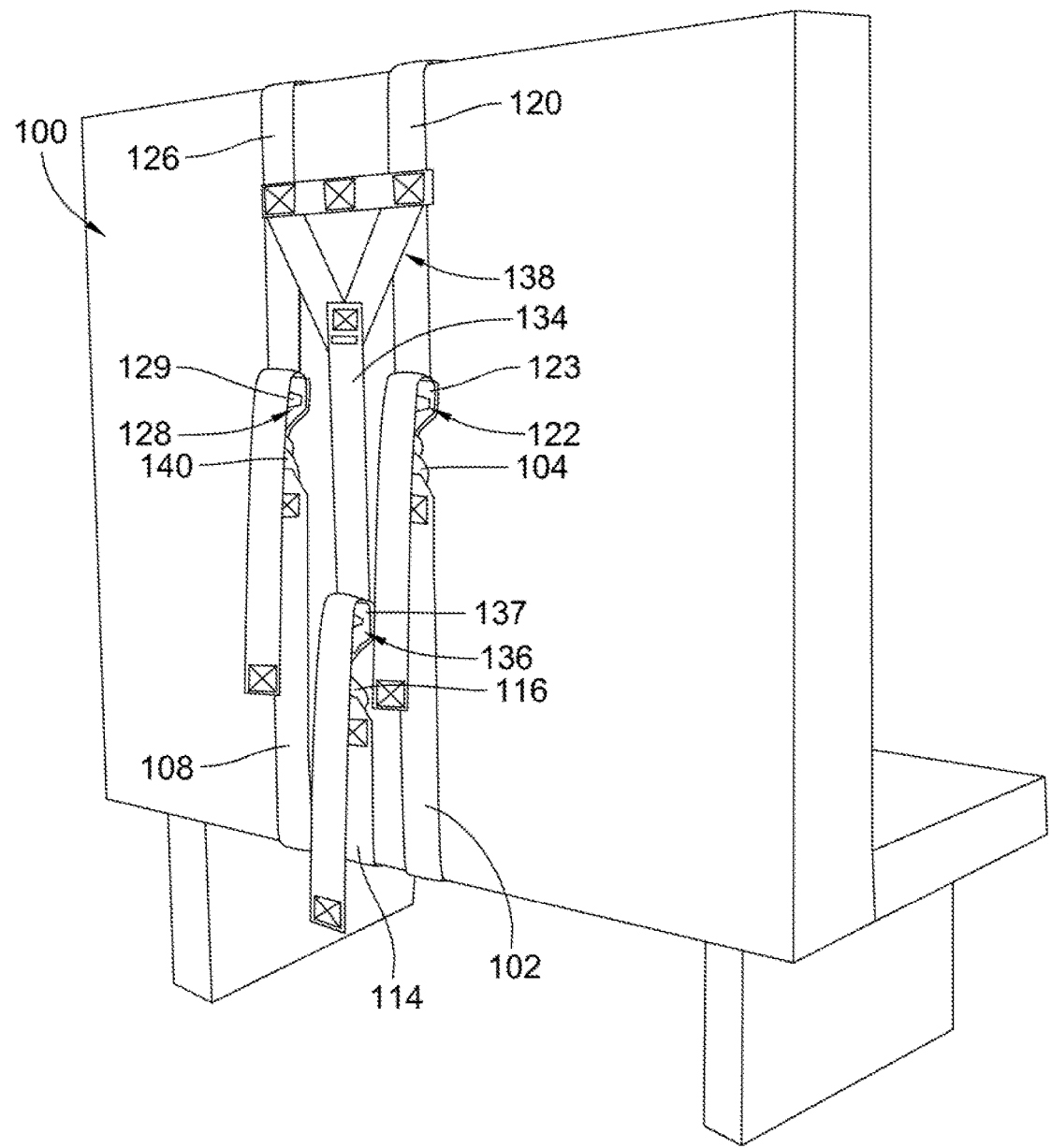
FIG. 7 depicts another perspective view of the passenger seat of FIG. 1, with a back side view of an attachment webbing assembly visible.
Figure 8:
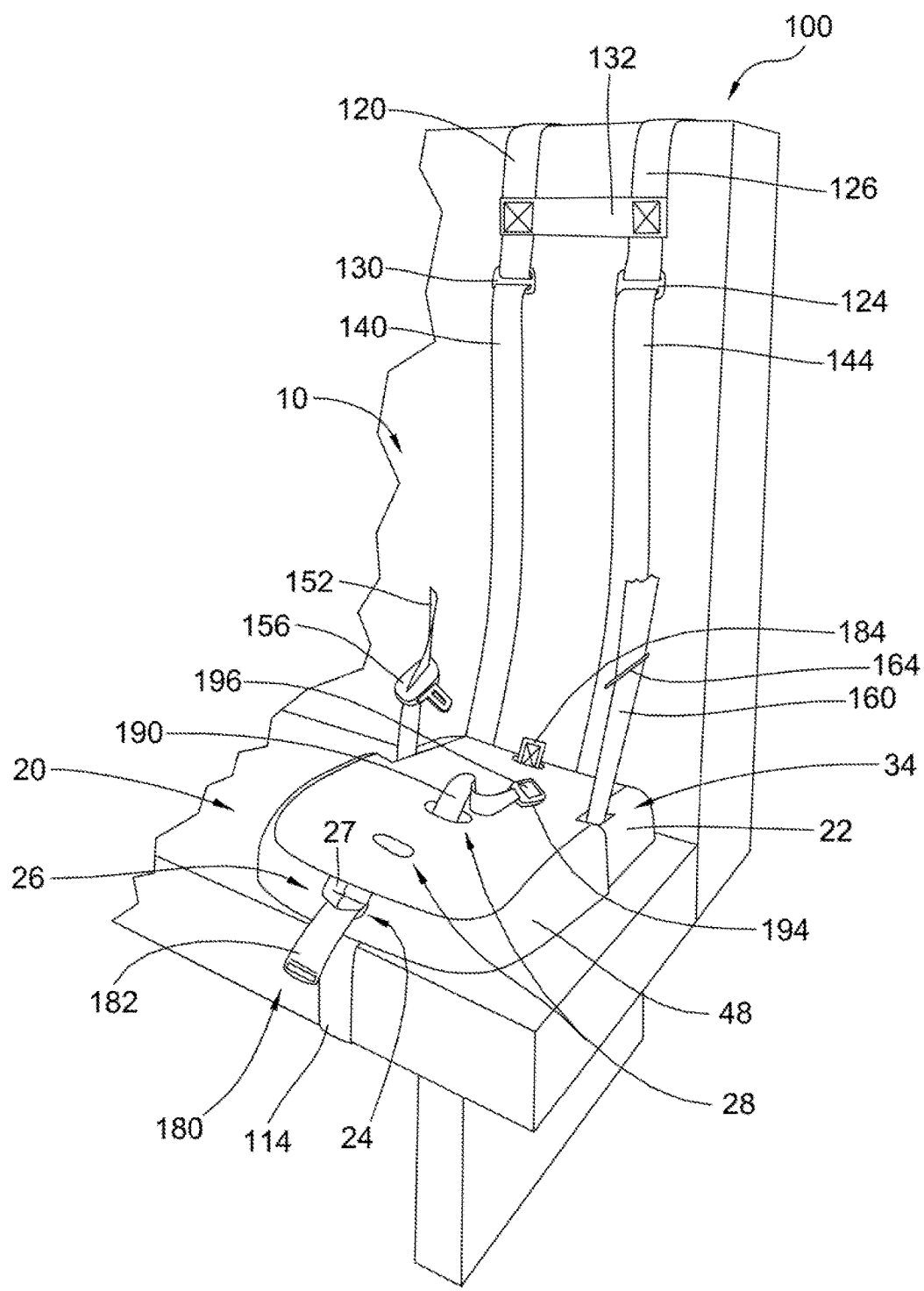
FIG. 8 depicts still another perspective view of the passenger seat of FIG. 1, with a shoulder webbing assembly partially cut away.

FIGS. 6-8 show attachment webbing assembly (100) in greater detail. Attachment webbing assembly (100) generally comprises a plurality of straps (102, 108, 114, 120, 126, 134, 140, 144) connected by buckles (106, 112, 118, 124, 130, 124, 130) and/or clasps (104, 110, 116, 122, 128, 136) into a single assembly that is generally configured to attach base (20) to a suitable vehicle seat. Straps (102, 108, 114, 120, 126, 134, 140, 144) of the present example comprise a nylon woven web material similar in character to a seatbelt material. Although straps (102, 108, 114, 120, 126, 134, 140, 144) of the present example are described herein as being a nylon woven web, it should be understood that in other examples, woven webs of other suitable materials are used. Moreover, in still other examples other non-web strap materials are used in alternative to a woven web. Because of the number of straps (102, 108, 114, 120, 126, 134, 140, 144) used with passenger seat (10), it should be understood that in some examples any one or more of straps (102, 108, 114, 120, 126, 134, 140, 144) are color-coded to permit such straps (102, 108, 114, 120, 126, 134, 140, 144) to be easily identifiable by an operator.

Buckles (106, 112, 118, 124, 130, 124, 130) in the present example are generally all substantially similar. In particular, each buckle (106, 112, 118, 124, 130, 124, 130) comprises a triglide buckle, with straps (102, 108, 114, 120, 126, 134, 140, 144) attaching to each respective buckle (106, 112, 118, 124, 130, 124, 130) using a conventional loop stitched into an end of a given strap (102, 108, 114, 120, 126, 134, 140, 144). Although a triglide buckle is used in the present example, it should be understood that numerous alternative buckles are used in other examples. In addition or in the alternative, in still other examples one or more buckles (106, 112, 118, 124, 130, 124, 130) are omitted and replaced with clasps similar to clasps (104, 110, 116, 122, 128, 136) described below or any other suitable coupling as will occur to those of skill in the art.

Clasps (104, 110, 116, 122, 128, 136) in the present example are generally all substantially similar. In particular, each clasp (104, 110, 116, 122, 128, 136) is configured to fasten to a corresponding adjacent clasp (104, 110, 116, 122, 128, 136) to connect one or more straps (102, 108, 114, 120, 126, 134, 140, 144) with another one or more straps (102, 108, 114, 120, 126, 134, 140, 144). Additionally, as is described in greater detail below, one or more clasps (104, 110, 116, 122, 128, 136) include adjustment features to permit selective adjustment of one or more corresponding straps (102, 108, 114, 120, 126, 134, 140, 144).

FIG. 6 shows the general path of straps (102, 108, 114, 120, 126, 134, 140, 144). In particular, a pair of bottom attachment straps (102, 108) and a single bottom central attachment strap (114) extend under at least a portion of a suitable vehicle seat. Bottom attachment straps (102, 108) are mechanically grounded within base (20) by attaching to a corresponding buckle (106, 112) as described above. Bottom attachment straps (102, 108) extend from base (20) through an interface between a seat portion and back rest portion of a suitable vehicle seat. Bottom attachment straps (102, 108) then extend upwardly toward a corresponding pair of upper attachment straps (120, 126). Each bottom attachment strap (102, 108) terminates in a clasp (104, 110) attached to an end of each bottom attachment strap (102, 108). Clasp (104, 110) then selectably attaches to a corresponding clasp (122, 128) of a corresponding upper attachment strap (120, 126), as is described in greater detail below.

Unlike bottom attachment straps (102, 108), bottom central attachment strap (114) extends underneath a seat portion of a suitable vehicle seat. In particular, bottom central attachment strap (114) is mechanically grounded within base (20) by attaching to a corresponding buckle (118) as described above. Bottom central attachment strap (114) then extends downwardly from base (20), looping around a seat portion of a suitable vehicle seat before extending upwardly toward a corresponding upper central attachment strap (134). Bottom central attachment strap (114) terminates in a clasp (116) attached to an end of bottom central attachment strap (114). Clasp (116) then selectably attaches to a corresponding clasp (136) of upper central attachment strap (134), as is described in greater detail below. Although not shown, it should be understood that in some examples bottom central attachment strap (114) comprises a unique color to differentiate bottom central attachment strap (114) from bottom attachment straps (102, 108). Such a feature may be desirable because differentiation between straps (102, 108, 114) may assist an operator during installation of passenger seat (10).

A lower portion of each upper attachment strap (120, 126) attaches to a respective clasp (122, 128). Each clasp (122, 128) corresponds to clasp (104, 110) such that each clasp (122, 128) is selectably couplable to a respective clasp (104, 110) of a respective bottom attachment strap (102, 108). In the present example, clasps (122, 128) comprise a hook, while clasps (104, 110) comprise a ring, although any other suitable clasping mechanism may be used. Additionally, each clasp (122, 128) of the present example includes an adjustment lock (123, 129). As is described in greater detail below, each adjustment lock (123, 129) permits an operator to pull an end of a respective upper attachment strap (120, 126) to selectably tighten upper attachment strap (120, 126).

From each clasp (122, 128), each upper atment strap (120, 126) extends upwardly and then downwardly around an upper portion of a suitable vehicle seat. Each upper attachment strap (120, 126) then terminates at a respective buckle (124, 130), which couples each upper attachment strap (120, 126) to a respective lower attachment strap (140, 144). Upper attachment straps (120, 126) are further attached to each other by lateral strap (132). Lateral strap (132) is configured to maintain lateral spacing between upper attachment straps (120, 126). In some examples, such a feature may be desirable because maintaining lateral spacing may be beneficial during storage and/or installation of passenger seat (10). It should be understood, however, that lateral strap (132) is generally optional and may be omitted in some examples.

A lower portion of upper central attachment strap (134) attaches to a corresponding clasp (136). Clasp (136) corresponds to clasp (116) such that clasp (136) is selectably couplable to clasp (116) of bottom central attachment strap (114). Like clasps (122, 128) described above, clasp (136) comprises a hook. Similarly, clasp (116) comprises a ring. Also like clasps (122, 128), clasp (136) includes an adjustment lock (137). As is described in greater detail below, adjustment lock (137) permits an operator to pull an end of upper central attachment strap (134) to selectably tighten upper central attachment strap (134).

From clasp (136), upper central attachment strap (134) extends upwardly behind the vehicle seat toward a yoke (138). Yoke (138) comprises a plurality of straps forming a downwardly oriented triangle pattern. Generally, yoke (138) is configured to couple upper central attachment strap (134) to each upper attachment strap (120, 126). In the present examples, yoke (138) fixedly secures upper central attachment strap (134) to each upper attachment strap (120, 126), although it should be understood that in other examples yoke (138) includes couplings, latches, buckles, and/or other features to permit upper central attachment strap (134) to be selectively coupled to each upper attachment strap (120, 126).

As can best be seen in FIG. 8, an upper end of each lower attachment strap (140, 144) couples to a respective buckle (124, 130) of a respective upper attachment strap (120, 126). From each buckle (124, 130), each lower attachment strap (140, 144) extends downwardly to base (20). A bottom end of each lower attachment strap (140, 144) then attaches to a respective buckle (106, 112) in base (20) to couple each lower attachment strap (140, 144) to base (20) as described above. Thus, lower attachment straps (140, 144) complete a loop that extends around a suitable vehicle seat to securely fasten base (20) to the vehicle seat.

Figure 9:
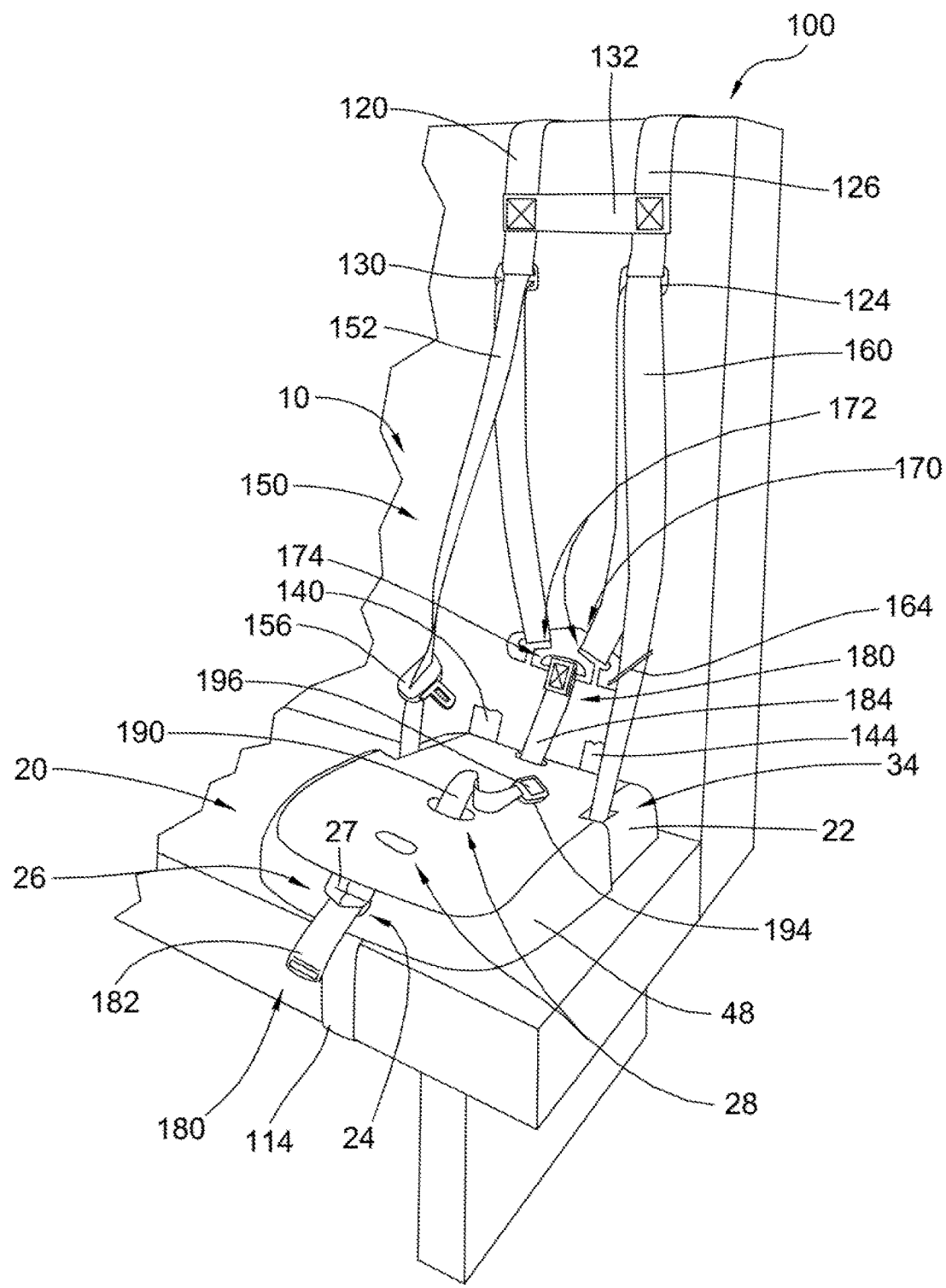
FIG. 9 depicts yet another perspective view of the passenger seat of FIG. 1, with the attachment webbing assembly of FIG. 7 partially cut-away.

FIG. 9 shows shoulder webbing assembly (150) in greater detail. At least a portion of attachment webbing assembly (100) is cut away for clarity. Shoulder webbing assembly (150) comprises a pair of shoulder straps (152, 160), an adjustment strap (180), and a crotch strap (190), which are together configured to permit shoulder webbing assembly (150) to selectively secure passengers having variable size attributes. As described above, shoulder straps (152, 160) couple to base (20) using a respective buckle (154, 162) on the lower end of each shoulder strap (152, 160). Each shoulder strap (152, 160) then extends upwardly toward buckles (124, 130). Between base (20) and buckles (124, 130), a respective waist buckle (154, 164) is slidably disposed on each shoulder strap (152, 160). Each waist buckle (154, 164) is configured to mate with a single corresponding clasp (194) of crotch strap (190). As is described in greater detail below, this permits a three-way connection between crotch strap (190) and shoulder straps (152, 160) to selectively secure a passenger within passenger seat (10).

Also between base (20) and buckles (124, 130), a respective shoulder height adjustment slider (158, 166) is slidably disposed on each shoulder strap (152, 160). Each shoulder height slider (158, 166) generally comprises a rectangular member that encompasses a respective shoulder strap (152, 160) at two points. Moreover, each shoulder height adjustment slider (158, 166) is slidable along the longitudinal length of its respective shoulder strap (152, 160). As is described in greater detail below, this slidable feature permits an operator to adjust the vertical positioning of shoulder height sliders (158, 166) for the particular shoulder height of a passenger.

Each shoulder strap (152, 160) loops through a respective buckle (124, 130) coupling upper attachment straps (120, 126) and lower attachment straps (140, 144). Each buckle (124, 130) is configured to receive a respective shoulder strap (152, 160) such that shoulder straps (152, 160) are slidable relative to buckles (124, 130). Shoulder straps (152, 160) then extend downwardly from buckles (124, 130) again through shoulder height adjustment sliders (158, 166). Once through shoulder height adjustment sliders (158, 166), shoulder straps (152, 160) continue downwardly to couple to a Y-bracket (170) that is associated with adjustment strap (180).

Y-bracket (170) is generally configured to couple each shoulder strap (152, 160) to an adjustment portion (184) of adjustment strap (180). In particular, Y-bracket (170) has a generally triangular shape and includes a pair of shoulder strap openings (172) and a single adjustment strap opening (174). Each shoulder strap (152, 160) couples to a respective shoulder strap opening (172). Likewise, adjustment strap (180) couples to adjustment strap opening (174). As is described in greater detail below, Y-bracket (170) permits shoulder straps (152, 160) to be adjusted in response to translation of adjustment strap (180).

Adjustment strap (180) extends downwardly from Y-bracket (170) into base (20). As described above, core (22) of base (20) receives adjustment strap (180) within a channel (44) defined therein, thereby permitting adjustment strap (180) to extend through core (22) and out of front adjustment opening (24). As is described in greater detail below, this permits an operator to pull actuation portion (182) of adjustment strap (180) to translate adjustment portion (184) to thereby adjust shoulder straps (152, 160).

As described above, crotch strap (190) may be positioned by an operator in either one of the crotch openings (28). Crotch strap (190) is of a generally fixed length and is held within base (20) by buckle (192) that is secured to the lower end of crotch strap (190), as described above. However, as was also described above, the particular effective length of crotch strap (190) may be varied depending upon which crotch opening (28) crotch strap (190) is disposed in. A clasp (194) is attached to the upper end of crotch strap (190). Clasp (194) is configured to receive each waist buckle (156, 162) of each shoulder strap (152, 160) and comprises a push button (196) to permit selective release of each buckle (156, 162), once each buckle is disposed within clasp (194).

FIGS. 10-14 show an exemplary procedure for adjusting passenger seat (10) to fit a particular vehicle seat and a particular passenger. It should be understood that although the foregoing adjustments are shown in a particular order, any suitable order may be used. For instance, FIGS. 10-13 show the passenger seat (10) first being adjusted to fit a particular vehicle seat, followed by an adjustment procedure for shoulder webbing assembly (150), and then an adjustment for crotch strap (190). In other uses, any other suitable order may be used, such as adjusting crotch strap (190) first, then attachment webbing assembly (100), the shoulder webbing assembly (150). Of course, any other suitable order may be used as will be apparent to those of ordinary skill in the art in view of the teachings herein.

Figure 10:
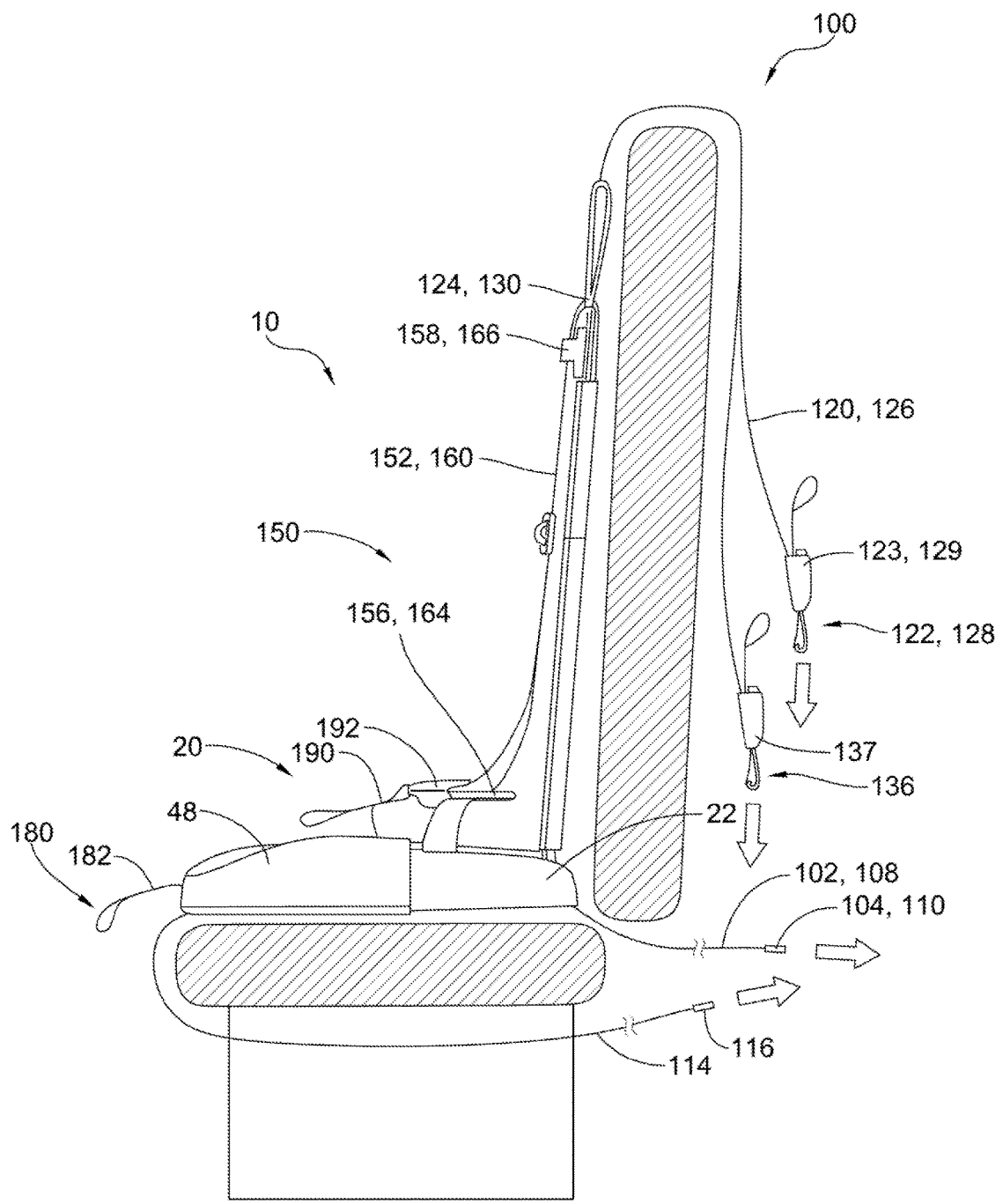
FIG. 10 depicts another side elevational view of the passenger seat of FIG. 1, with the attachment webbing assembly of FIG. 7 being connected.
Figure 11:
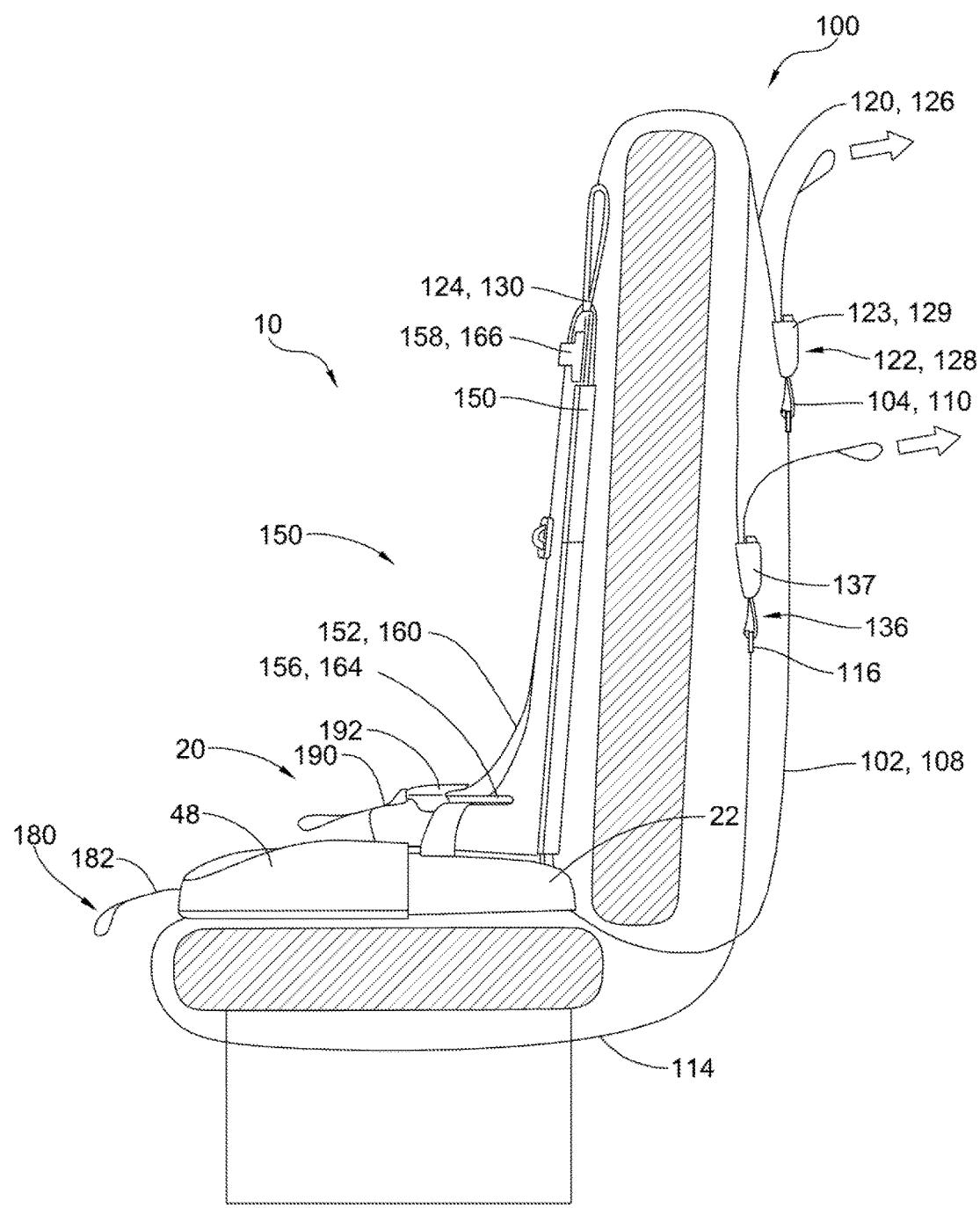
FIG. 11 depicts still another side elevational view of the passenger seat of FIG. 1, with the attachment webbing assembly of FIG. 7 being adjusted.

FIGS. 10 and 11 show an exemplary procedure for attaching and adjusting passenger seat (10) to a suitable vehicle seat. Initially, an operator places base (20) on a bench portion of a suitable vehicle seat. Next, as is best seen in FIG. 10, upper attachment straps (120, 126) and upper central attachment straps (134) are positioned over a seat back of a suitable vehicle seat. Bottom central attachment strap (114) is threaded underneath the bench, and bottom attachment straps (102, 108) are threaded between the bench and the seat back. Bottom central attachment strap (114) and bottom attachment straps (102, 108) are next pulled upwardly by an operator to couple clasp (104) with clasp (122), clasp (110) with clasp (128), and clasp (116) with clasp (136). With all clasps (104, 122, 110, 128, 116, 136) appropriately connected, an operator next pulls a free end of upper attachment straps (120, 126) and upper central attachment strap (134) as shown in FIG. 11. Adjustment locks (123, 129, 137) of the respective clasps (122, 128, 136) permit the slack to be removed from attachment webbing assembly (100). Once a suitable amount of slack as been removed, an operator may release upper attachment straps (120, 126) and upper central attachment strap (134). Once released, adjustment locks (123, 129, 137) will maintain attachment webbing assembly (100) in a snug configuration, thereby attaching passenger seat (10) to a suitable vehicle seat.

Figure 12:
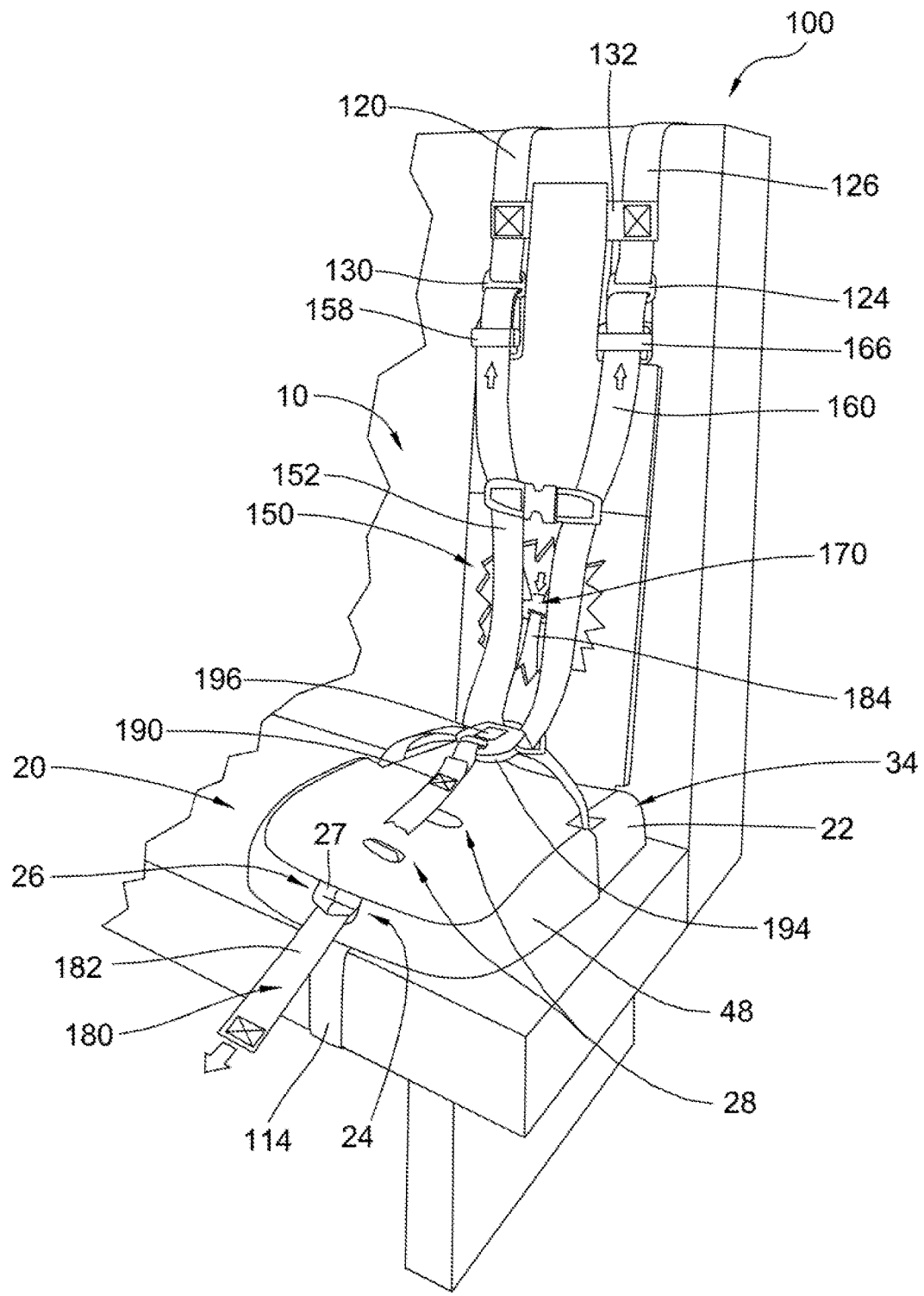
FIG. 12 depicts yet another perspective view of the passenger seat of FIG. 1, with a seat back partially cut away and the shoulder webbing assembly of FIG. 8 being adjusted.

FIG. 12 shows an exemplary procedure for adjusting shoulder webbing assembly (150). As can be seen, shoulder webbing assembly (150) is generally adjusted by an operator actuating actuation portion (182) of adjustment strap (180). For instance, as actuation portion (182) is pulled outwardly from base (20) as shown in FIG. 12, adjustment portion (184) of adjustment strap (180) correspondingly translates downwardly within pad (48). This downward translation pulls the ends of shoulder straps (152, 160) connected to Y-bracket (170) downwardly, thereby pulling any slack out of shoulder straps (152, 160).

Once shoulder straps (152, 160) are pulled taut to an adjusted position, an operator may release actuation portion (182) of adjustment strap (180). Adjustment lock (26) will then retain actuation portion (182) in the adjusted position indefinitely. This is because adjustment lock (26) is configured to act as a one-way lock device that provides a linear ratchet effect. In other words, adjustment lock (26) permits adjustment strap (180) to be pulled outwardly, but not inwardly (unless lock actuator (27) is actuated by an operator). To return shoulder straps (152, 160) to their initial position, or to otherwise loosen shoulder straps (152, 160), an operator may push lock actuator (27) of adjustment lock (28). Pushing lock actuator (27) releases adjustment lock (28) and permits adjustment strap (180) to move freely relative to base (10).

Figure 13:
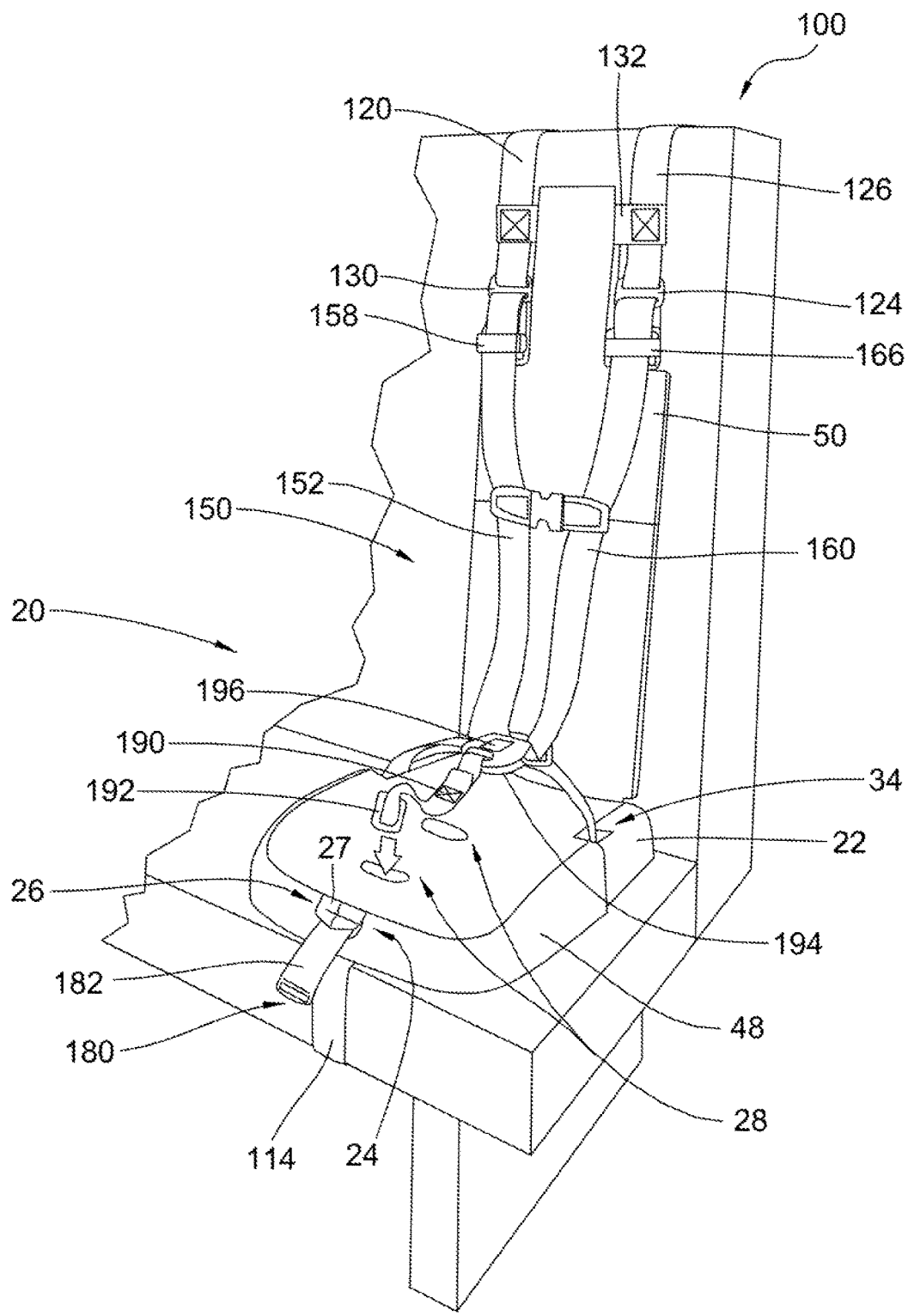
FIG. 13 depicts yet another perspective view of the passenger seat of FIG. 1, with a crotch strap being adjusted from a first position to a second position.
Figure 14:
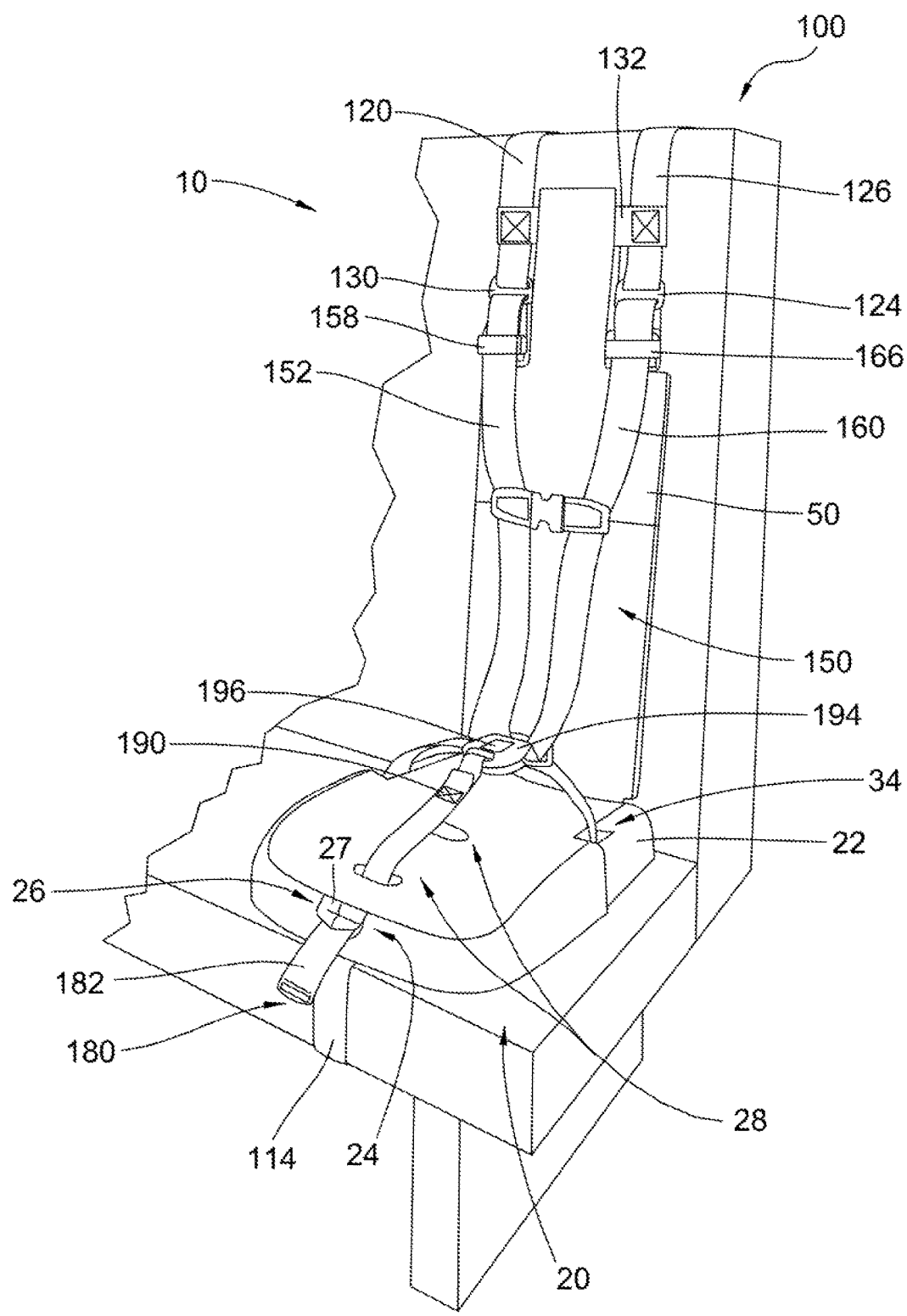
FIG. 14 depicts yet another perspective view of the passenger seat of FIG. 1, with the crotch strap of FIG. 13 in the second position.

FIGS. 13 and 14 show an exemplary procedure for adjusting the position and length of crotch strap (190). As described above, base includes two discreet crotch openings (28). As also described above, each crotch opening is associated with a separate first support portion (30) or a second support portion (32) that may receive a buckle (192) associated with crotch strap (190). Initially, crotch strap (190) may be inserted into the rearward crotch opening (28) (as shown in FIG. 1). With its more rearward position, the rearward crotch opening (28) may be associated with a smaller passenger. To also support a smaller passenger, the rearward crotch opening (28) provides a shorter effective length of crotch strap (190) when crotch strap (190) is inserted therein. In particular, as discussed above, the rearward crotch opening (28) is associated with second support portion (32), which is spaced further from crotch opening (28) to provide a shorter effective length of crotch strap (190).

Similarly, the forward crotch opening (28) is configured to support a larger passenger both because of its positioning and association with first support portion (30). To adjust crotch strap (190) to be positioned in the forward crotch opening (28) an operator initially removes crotch strap (190) from the rearward crotch opening (28). To accomplish such a removal, some slack is supplied to crotch strap (190), pushing at least some of crotch strap (190) into the rearward crotch opening (28). Buckle (192) is then repositioned longitudinally relative to the rearward crotch opening (28) such that buckle (192) may pass relatively unencumbered through the rearward crotch opening (28).

To position crotch strap (190) into the forward crotch opening (28), buckle (192) is again positioned longitudinally relative to the forward crotch opening (28) as shown in FIG. 13. Buckle (192) is then inserted into the forward crotch opening (28). Once buckle (192) is fully inserted, buckle (192) is then reoriented transversely relative to the forward crotch opening (28) to thereby engage first support portion (30). Crotch strap is now secured within the forward crotch opening (28) as shown in FIG. 14.

Although base (20) is described herein as having only two crotch openings (28), it should be understood that base (20) is be equipped with numerous crotch openings (28) in other examples. In such examples, additional crotch openings (28) are equipped with support portions similar to support portions (30, 32) described above, but with different spacing relative to their respective additional crotch openings (28). Such spacing may be relatively uniform, or stepped from one crotch opening to another. Of course any other suitable configuration of crotch openings (28) may be used as will be apparent to those of ordinary skill in the art in view of the teachings herein.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of the structure and operation show and described in the specification and drawings.

What is claimed is:

1. A passenger seat for use with an existing vehicle seat comprising:
   a base, wherein the base comprises a front adjustment opening;
   an attachment assembly, wherein the attachment assembly comprises a plurality of straps, wherein the plurality of straps are configured to adjustably secure the base to the vehicle seat;

a restraint assembly comprising a shoulder strap assembly, a crotch strap assembly, a Y-bracket, and an adjustment strap, wherein:
  the shoulder strap assembly and the crotch strap assembly are configured to selectably fasten to each other to secure a passenger,
  the Y-bracket coupling the adjustment strap to the shoulder strap assembly,
  the adjustment strap extends from the shoulder strap assembly through the base and out of the front adjustment opening of the base, and
  the adjustment strap assembly is configured to adjust the shoulder strap assembly and the crotch strap assembly in response to translation of the adjustment strap through the front adjustment opening of the base;
an adjustment lock, wherein
  the adjustment lock is disposed in the front adjustment opening of the base and is configured to receive the adjustment strap;
  the adjustment lock is configured to permit the adjustment strap to translate freely in a first direction; and
  the adjustment lock is configured to selectively lock translation of the adjustment strap in a second direction that is opposite the first direction;
a non-rigid back that at least partially encompasses at least a portion of the restraint assembly and the attachment assembly, wherein the back wraps around the Y-bracket and the portion of the restraint assembly and the attachment assembly, wherein the Y-bracket is enclosed inside the back, wherein the back is flexible and collapsible to promote stowability.

2. The passenger seat of claim 1, wherein the back has an interior side, wherein the interior side is directly adjacent to at least a portion of each of the restraint assembly and the attachment assembly.

3. The passenger seat of claim 2, wherein the restraint assembly and the attachment assembly are slidable relative to the interior side of the back.

4. The passenger seat of claim 2, wherein the back has an exterior side that is directly adjacent to the passenger when the passenger seat is in use.

5. The passenger seat of claim 1, further comprising an adjustment lock, wherein
  the adjustment lock is disposed in the front adjustment opening of the base and is configured to receive the adjustment strap;
  the adjustment lock is configured to permit the adjustment strap to translate freely in a first direction; and
  the adjustment lock is configured to selectively lock translation of the adjustment strap in a second direction that is opposite the first direction.

6. The passenger seat of claim 5, wherein:
the adjustment lock comprises an actuator,
the actuator is responsive to user input between a first position and a second position,
the actuator is resiliently biased towards the first position, and
the adjustment lock is configured to selectively unlock translation of the adjustment strap in the second direction when the actuator is in the second position.

7. The passenger seat of claim 1, wherein:
the crotch strap assembly comprises a crotch strap,
the base further comprises a first crotch hole, a second crotch hole, a first support portion associated with the first crotch hole, and a second support portion associated with the second crotch hole,
the crotch strap is configured to be received by either the first support portion or the second support portion,
the crotch strap has a first effective length when supported by the first support portion,
the crotch strap has a second effective length when supported by the second support portion, and
the second effective length is shorter than the first effective length.

8. The passenger seat of claim 7, wherein:
a first distance is disposed between the first crotch hole and the first support portion,
a second distance is disposed between the second crotch hole and the second support portion, and
the second distance is greater than the first distance.

9. The passenger seat of claim 1, wherein at least one of the straps of the plurality of straps of the attachment assembly is of a different color than another one of the straps of the plurality of straps of the attachment assembly.

10. A collapsible restraining system, comprising:
a base defining a first adjustment opening and a second adjustment opening;
a Y-bracket;
a pair of shoulder straps, each comprising a first end and a second end, wherein:
  the first end of each shoulder strap is releasably secured to the base,
  the second end of each shoulder strap is secured to the Y-bracket, and
  the shoulder straps are configured to selectably restrain a passenger in a vehicle;
an adjustment strap, wherein
  the adjustment strap comprises an actuation portion and an adjustment portion,
  the actuation portion extends through the first adjustment opening and out the second adjustment opening, and
  the adjustment portion is secured to the Y-bracket;
a non-rigid back that at least partially encompasses the Y-bracket, at least a portion of each of the pair of shoulder straps, and at least a portion of the adjustment portion of the adjustment strap, wherein the back includes a flexible material that forms a pocket where the Y-bracket is able to slide, wherein the back encircles the Y-bracket to facilitate translation movement within the back, wherein the back is slightly thicker than the shoulder straps; and
an adjustment lock, wherein
  the adjustment lock is disposed in the second adjustment opening of the base,
  the adjustment lock is configured to engage with the adjustment strap to permit unidirectional translation of the adjustment strap.

11. The collapsible restraining system of claim 10, wherein:
the first adjustment opening and the second adjustment opening of the base are both positioned along a central longitudinal axis of the base,
the first adjustment opening is positioned adjacent to a rear end of the base, and
the second adjustment opening is positioned adjacent to a front end of the base.

12. The collapsible restraining system of claim 10, wherein:
the Y-bracket comprises a generally triangular shape,
the Y-bracket further comprises two shoulder strap openings and a single adjustment strap opening, each shoulder strap is coupled to one of the shoulder strap openings, and the adjustment strap is coupled to the adjustment strap opening.

13. The collapsible restraining system of claim 10, wherein Y-bracket is configured to simultaneously remove slack from each shoulder strap of the pair of shoulder straps in response to an operator pulling the actuation portion of the adjustment strap outwardly away from the base.

14. A method of adjusting a passenger seat in an vehicle seat within a vehicle, wherein the passenger seat comprises a base, a pair of shoulder straps, a crotch strap, an adjustment strap, a Y-bracket, a non-rigid back, one or more attachment straps, and an adjustment lock, wherein the base comprises a first crotch opening, a second crotch opening, and a front adjustment opening, and wherein the back substantially surrounds at least part of each shoulder strap and at least part of the adjustment strap, the method comprising:

uncollapsing the non-rigid back, wherein the back is flexible;

placing the base on the vehicle seat;

attaching the base to the vehicle seat with the attachment straps so that the back extends upward;

positioning a passenger on the base;

attaching each shoulder strap of the pair of shoulder straps to the crotch strap; and snugging the pair of shoulder straps and the crotch strap relative to the passenger by pulling an end of the adjustment strap that extends outwardly from the base and through the adjustment lock away from the adjustment lock, wherein the Y-bracket couples the part of each shoulder strap to the part of the adjustment strap, wherein the back surrounds the Y-bracket, wherein during said snugging the Y-bracket along with the part of each shoulder strap and the part of the adjustment strap slide within the back out of contact with a passenger and the vehicle seat.

* * * * *

UNITED STATES PATENT AND TRADEMARK OFFICE
CERTIFICATE OF CORRECTION

PATENT NO. : 10,259,357 B2  
APPLICATION NO. : 15/071697  
DATED : April 16, 2019  
INVENTOR(S) : Guy R. Dingman et al.

Page 1 of 1

It is certified that error appears in the above-identified patent and that said Letters Patent is hereby corrected as shown below:

On the Title Page

Item (73), replace "Westfield, MA" with --Westfield, IN--

Signed and Sealed this  
Twenty-eighth Day of May, 2019

Andrei Iancu  
*Director of the United States Patent and Trademark Office*